(12) United States Patent
Hoshuyama et al.

(10) Patent No.: US 7,596,264 B2
(45) Date of Patent: Sep. 29, 2009

(54) IMAGE FILE PROCESSING METHOD INCLUDING COLOR SPACE CONVERSION AND CORRESPONDING IMAGE FILE PROCESSING APPARATUS

(75) Inventors: Hideo Hoshuyama, Kawasaki (JP); Kiyoshige Shibazaki, Higashimurayama (JP); Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/216,509

(22) Filed: Jul. 7, 2008

(65) Prior Publication Data
US 2008/0273792 A1    Nov. 6, 2008

Related U.S. Application Data

(63) Continuation of application No. 10/859,081, filed on Jun. 3, 2004, now abandoned.

(30) Foreign Application Priority Data
Jun. 6, 2003    (JP) .............................. 2003-162174

(51) Int. Cl.
*G06K 9/00*    (2006.01)
*H04N 5/225*    (2006.01)

(52) U.S. Cl. .................................... 382/162; 348/207.2

(58) Field of Classification Search .................. 382/162
See application file for complete search history.

(56) References Cited

U.S. PATENT DOCUMENTS

| 5,258,829 | A | * | 11/1993 | Matsunaga et al. ........... 348/659 |
| 5,349,452 | A | | 9/1994 | Maeda et al. |
| 5,369,261 | A | * | 11/1994 | Shamir ........................ 235/469 |
| 5,504,821 | A | * | 4/1996 | Kanamori et al. ............ 382/167 |
| 5,583,656 | A | * | 12/1996 | Gandhi et al. ................ 382/234 |
| 5,668,596 | A | * | 9/1997 | Vogel ........................ 348/222.1 |
| 5,946,113 | A | * | 8/1999 | Pritchett ...................... 358/520 |
| 5,987,167 | A | * | 11/1999 | Inoue .......................... 382/167 |
| 6,366,692 | B1 | * | 4/2002 | Acharya ...................... 382/162 |
| 6,519,361 | B1 | * | 2/2003 | Taillie et al. ................. 382/162 |
| 6,980,325 | B1 | | 12/2005 | Sugiura et al. |
| 7,266,239 | B2 | | 9/2007 | Akiyama et al. |

(Continued)

FOREIGN PATENT DOCUMENTS

CN    1349347 A    5/2002

(Continued)

*Primary Examiner*—Bhavesh M Mehta
*Assistant Examiner*—David P Rashid
(74) *Attorney, Agent, or Firm*—Oliff & Berridge, PLC

(57) ABSTRACT

An image file processing method adopted in an image file processing apparatus, includes steps for: inputting from the outside an image file containing at least color information corresponding to each of pixels defined by a color space used in the image file, a color space identification tag indicating whether or not the color space used in the image file is a first color space and a color space information tag providing color space information related to the color space used in the image file; making a decision as to whether or not the color space used in the image file is the first color space based upon the color space identification tag; and referencing the color space information tag in the image file if the color space used in the image file is determined not to be in the first color space.

10 Claims, 3 Drawing Sheets

U.S. PATENT DOCUMENTS

| | | |
|---|---|---|
| 2001/0045988 A1* | 11/2001 | Yamauchi et al. ............ 348/273 |
| 2002/0027603 A1* | 3/2002 | Kuwata et al. ............... 348/232 |
| 2002/0030833 A1 | 3/2002 | Kuwata et al. |
| 2002/0041761 A1* | 4/2002 | Glotzbach et al. ........... 396/429 |
| 2002/0044293 A1 | 4/2002 | Fukasawa |
| 2002/0080380 A1* | 6/2002 | Sugiura et al. ............... 358/1.13 |
| 2002/0122194 A1 | 9/2002 | Kuwata et al. |
| 2002/0135687 A1 | 9/2002 | Nakajima et al. |
| 2002/0140952 A1 | 10/2002 | Fukasawa |
| 2002/0196346 A1* | 12/2002 | Nishio et al. ............... 348/207.2 |
| 2003/0034986 A1 | 2/2003 | Fukasawa |
| 2003/0071903 A1 | 4/2003 | Nakami |
| 2004/0066533 A1 | 4/2004 | Nakajima |
| 2004/0075754 A1 | 4/2004 | Nakajima et al. |
| 2004/0246526 A1 | 12/2004 | Ishigami et al. |
| 2006/0146196 A1 | 7/2006 | Suenaga et al. |

FOREIGN PATENT DOCUMENTS

| | | |
|---|---|---|
| EP | 1 271 404 A2 | 1/2002 |
| EP | 1 569 471 A1 | 8/2005 |
| JP | A 06-233127 | 8/1994 |
| JP | A 2002-116946 | 4/2002 |
| JP | A 2002-281329 | 9/2002 |
| JP | A 2002-314831 | 10/2002 |
| JP | A 2003-037850 | 2/2003 |
| JP | A 2003-087587 | 3/2003 |
| JP | A 2003-153025 | 5/2003 |

* cited by examiner

IMAGE FILE PROCESSING METHOD INCLUDING COLOR SPACE CONVERSION AND CORRESPONDING IMAGE FILE PROCESSING APPARATUS

This is a Continuation of application Ser. No. 10/859,081 filed Jun. 3, 2004. The disclosure of the prior application is hereby incorporated by reference herein in its entirety.

INCORPORATION BY REFERENCE

The disclosure of the following priority application is herein incorporated by reference:

Japanese Patent Application No. 2003-162174 filed Jun. 6, 2003

BACKGROUND OF THE INVENTION

1. Field of the Invention

The present invention relates to a method of processing image files recorded by a digital camera or the like.

2. Description of the Related Art

Image file recording methods adopted in digital cameras and the like include the format which is in compliance with the camera file system standard (DCF: Design Rules for Camera File System ver 1.0) set by the Japanese Electronics Industry Design Association (JEIDA) Inc. There are apparatuses in the related art that read image files recorded in the DCF format (see, for instance, Japanese Laid Open Patent Publication No. 2002-116946).

SUMMARY OF THE INVENTION

The color space used in an image file in the DCF format, is defined as sRGB. Accordingly, standard apparatuses in compliance with the DCF format, including the reading apparatus disclosed in the Japanese Laid Open Patent Publication No. 2002-116946, process image files that have been read by assuming that the color information in the image files are expressed in sRGB. However, high-end apparatuses capable of producing very high-quality images require color information expressed in a color space other than the sRGB color space, with a wider range of color expression capability. The reading apparatus disclosed in the Japanese Laid Open Patent Publication No. 2002-116946 cannot accurately read the color information in image files using a color space other than the sRGB color space.

According to the 1st aspect of the invention, an image file processing method adopted in an image file processing apparatus, comprises steps for: inputting an image file; making a decision as to whether or not the input image file uses a specific color space; converting the specific color space to a color space suitable for processing to be executed in the image processing apparatus by using information stored in advance in the image processing apparatus if the input image file is determined to use the specific color space; and converting a color space used in the input image file to the color space suitable for the processing to be executed in the image processing apparatus by using information stored in the input image file if the input image file is determined to use a color space other than the specific color space.

According to the 2nd aspect of the invention, in the image file processing method according to the 1st aspect, it is preferred that: the information stored in advance in the image processing apparatus relates to conversion of the specific color space to the color space suitable for the processing to be executed in the image processing apparatus; and the information stored in the input image file relates to the color space used in the input image file.

According to the 3rd aspect of the invention, the image file processing method according to the 1st aspect, it is preferred that: the input image file includes color space identification information indicating whether or not the specific color space is used in the input image file; and a decision is made based upon the color space identification information as to whether or not the color space used in the input image file is the specific color space.

According to the 4th aspect of the invention, an image file processing method adopted in an image file processing apparatus, comprises steps for: inputting from the outside an image file containing at least color information corresponding to each of pixels defined by a color space used in the image file, a color space identification tag indicating whether or not the color space used in the image file is a first color space and a color space information tag providing color space information related to the color space used in the image file; making a decision as to whether or not the color space used in the image file is the first color space based upon the color space identification tag; and referencing the color space information tag in the image file if the color space used in the image file is determined not to be in the first color space.

According to the 5th aspect of the invention, the image file processing method according to the 4th aspect, it is preferred that: the color space used in the image file determined to be other than the first color space is converted to a second color space based upon the referenced color space information tag; and the color information in the image file is expressed by using the second color space.

According to the 6th aspect of the invention, the image file processing method according to the 5th aspect, it is preferred that: a transformation matrix to be used to convert the first color space to the second color space is stored in memory; if the color space used in the image file is determined to be the first color space, the color space used in the image file is converted from the first color space to the second color space based upon the transformation matrix; and if the color space used in the image file is determined to be other than the first color space, the transformation matrix is reorganized based upon the referenced color space information tag and the color space used in the image file is converted to the second color space based upon the reorganized transformation matrix.

According to the 7th aspect of the invention, an image file processing method adopted in an image file processing apparatus comprises steps for: storing in memory a transformation matrix to be used to convert a first color space to a second color space; inputting from the outside an image file containing at least color information corresponding to each of pixels defined by either the first color space or a third color space, a color space identification tag indicating whether or not a color space used in the image file is the first color space and a color space information tag providing color space information related to the third color space if the color space used in the image file is not the first color space; making a decision as to whether or not the color space used in the image file is the first color space based upon the color space identification tag; converting the color space used in the image file from the first color space to the second color space based upon the transformation matrix if the color space used in the image file is determined to be the first color space; reorganizing the transformation matrix based upon the color space information tag and converting the color space used in the image file from the third color space to the second color space based upon the reorganized transformation matrix, if the color space used in the image file is determined to be other than the first color space; and expressing the color information in the image file by using the second color space.

According to the 8th aspect of the invention, an image file processing apparatus comprises a processing unit that executes an image file processing method according to any of the 1st through the 7th aspects.

According to the 9th aspect of the invention, a computer-readable computer program product comprises a control program that executes an image file processing method according to any of the 1st through the 7th aspects.

DESCRIPTION OF THE PREFERRED EMBODIMENT

Figure 1:
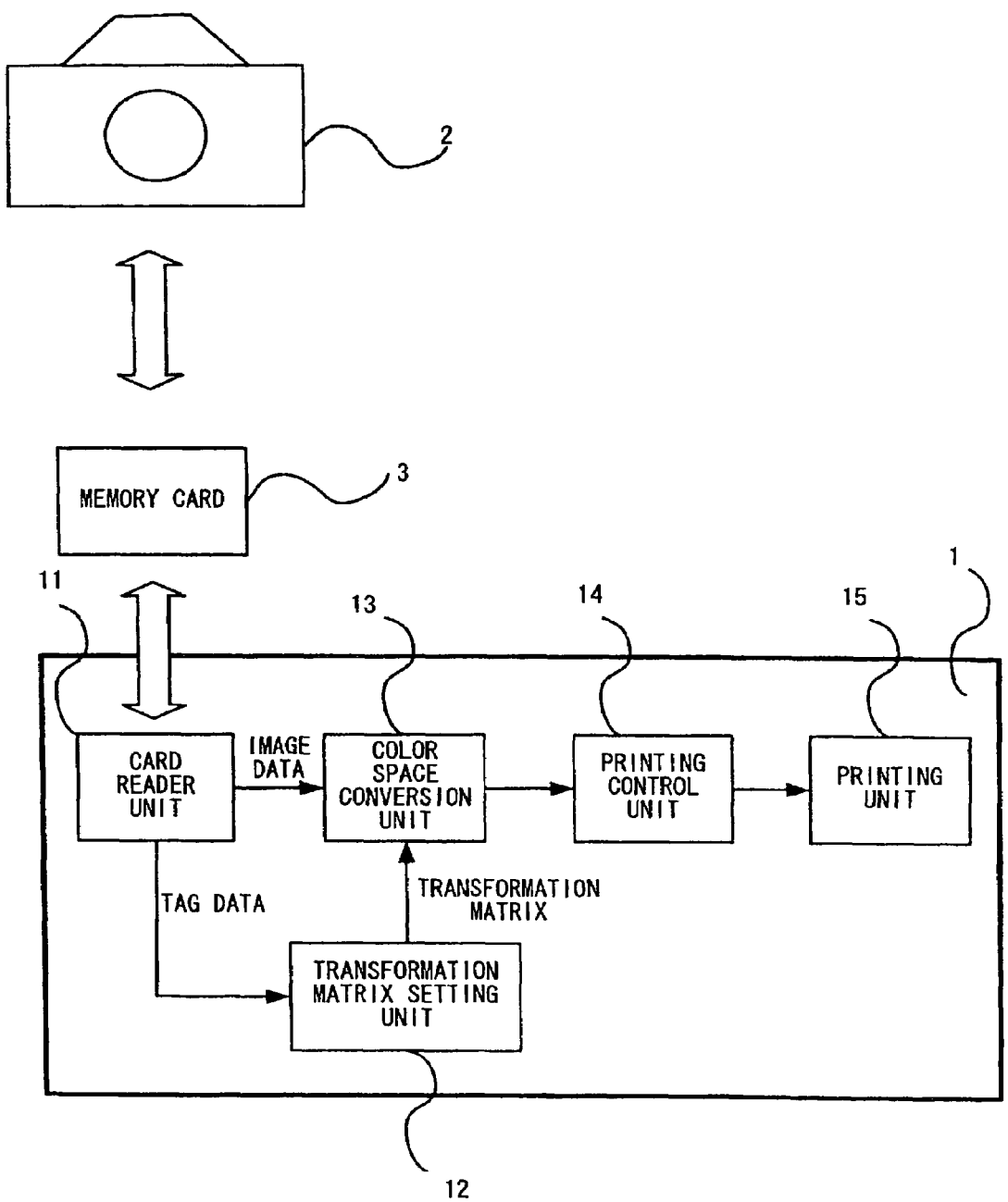
FIG. 1 shows the structure of the printing apparatus achieved in an embodiment of the present invention.

The structure adopted in the printing apparatus in an embodiment of the present invention is shown in FIG. 1. The printing apparatus 1, to which color image data of a captured image or the like photographed with a digital still camera (DSC) are input, prints out the image constituted of the color image data. When printing out the image, the printing apparatus 1 converts the color space set on the image data based upon color space information recorded in the image data. The printing apparatus 1 includes a card reader unit 11, a transformation matrix setting unit 12, a color space conversion unit 13, a printing control unit 14 and a printing unit 15. The card reader unit 11, the transformation matrix setting unit 12, the color space conversion unit 13, the printing control unit 14 and the like can be realized by executing a program in a processing device constituted with a microprocessor and its peripheral circuits. The card reader unit 11, the transformation matrix setting unit 12, the color space conversion unit 13, the printing control unit 14 and the like may be collectively referred to as a processing unit as well.

A memory card 3 is loaded into the card reader unit 11. The memory card 3, which is a card type removable memory, can also be loaded into the DSC 2. By loading the memory card 3 into a DSC 2, image files constituted with captured image data generated in the DSC 2 can be recorded into the memory card 3. In such a situation, the DSC 2 records the image files into the memory card 3 by adopting a recording format (hereafter referred to as DCF (2)), which is different from the conventional DCF standard. The DCF (2) format image files (hereafter simply referred to as the image files) recorded in the memory card 3 are input to the card reader unit 11 from the memory card 3 loaded therein. It is to be noted that an image file containing image data other than captured images generated in the DCS 2 may be recorded in the memory card 3 to be input to the card reader unit 11 as well.

Figure 2:
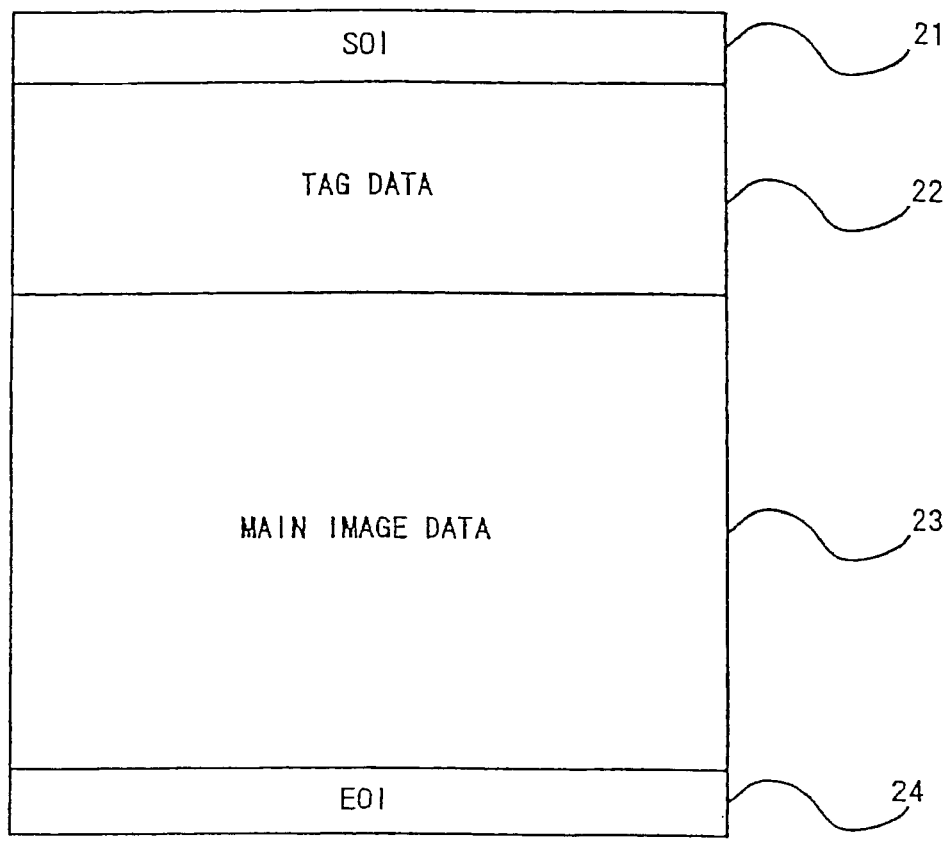
FIG. 2 shows the structure of an image file.

The structure of an image file recorded in the memory card 3 is shown in FIG. 2. The image file includes an SOI (start of image) 21, tag data 22, main image data 23 and an EOI (end of image) 24. The SOI 21 and the EOI 24 are portions respectively indicating the beginning and the end of the image file and are each constituted of a specific code string. The card reader unit 11 can recognize an image file by checking the SOI 21 and the EOI 24.

The main image data 23 correspond to the part of the image file in which image data of, for instance, a captured image obtained in the DSC 2 are recorded. The DSC 2 digitizes signals constituting a subject image that are input through a photographic lens (not shown) in units of individual pixels by utilizing an image-capturing element, an A/D converter and the like (not shown), and then converts the digital signals to captured image data through a specific type of signal processing. As the captured image data, color information corresponding to three color components R (red), G (green) and B (blue) is recorded in correspondence to each pixel, and these sets of color information are expressed by using either the sRGB color space or the Adobe (registered trademark) RGB color space. The user may choose which color space is to be used to express the color information through an operation of the DSC 2 in advance.

The sRGB color space is widely adopted in digital cameras, scanners and various types of monitors, and colors can be accurately expressed among apparatuses supporting the sRGB system. The Adobe RGB color space, on the other hand, allows color information to be expressed over a wider color range compared to the sRGB color space, and colors can be accurately reproduced among apparatuses supporting the Adobe RGB system. However, Adobe RGB compliant apparatuses cannot achieve accurate color reproduction by using image data expressed in the sRGB color space, and likewise, sRGB compliant apparatuses cannot achieve accurate color reproduction by using image data expressed in Adobe RGB color space. The DSC 2 expresses the color information in the captured image data by using either of the color spaces set in advance and records the color information thus expressed as the main image data 23. At this time, a specific type of compression processing, such as JPEG (Joint Photographic Experts Group) compression processing, may be executed on the captured image data and the compressed image data may be recorded as the main image data 23.

It is to be noted that the image-capturing element at the DSC 2 is a typical single-plate color image-capturing element having R, G and B color filters arranged in a Bayer array. Namely, while information for only one of the three color components R, G and B, is present in correspondence to each pixel when digital signals are generated via the image-capturing element and the A/D converter from the subject image input to the DSC 2, the specific type of signal processing mentioned earlier is executed to convert the digital signals to captured image data that contain color information corresponding to all the color components R, G and B for each pixel. While the term "pixel" is used to refer to each of the photoelectric conversion elements constituting the image-capturing element, the unit of photographic image data corresponding to a pixel of the photoelectric conversion element, too, is referred to as a pixel. In addition, the present invention adopts the concept that an image is constituted with a plurality of pixels.

The tag data 22 are a data portion having recorded therein various types of information related to the image file. The tag data 22 are constituted with various types of tags and hold various types of information corresponding to the individual tags. The tags include a tag having recorded therein photographing information such as the photographing date/time at which the image was photographed, the photographing conditions under which the image was photographed and the like, a tag having recorded therein a thumbnail image and tags having recorded therein information related to the file recording format.

The tags related to the image file recording format may include, for instance, the following. It is to be noted that each of the following tags has recorded therein a specific code string, and a given tag indicates specific numerical values or a specific meaning in correspondence to the code string.

(1) Compatibility identification Index: a tag used to identify the image file recording method, with "R98" recorded if the image file was recorded in compliance with the conventional DCF standard and "R03" recorded if the image file was recorded in compliance with the DCF (2) standard.
(2) Color space identification tag: a tag used to identify whether or not the color space in the image file is sRGB, with "calibrated" recorded if the image file uses the sRGB color space and "uncalibrated" recorded otherwise.
(3) Color space information tag: a tag having information (color space information) related to the color space in the image file, with the chromaticity coordinate values of a reference white point, the chromaticity coordinate values of the primary colors, the reproduction g value and the like recorded therein. These are explained later.

An image file adopting the structure described above is input to the card reader unit 11 from the memory card 3 loaded therein. The tag data in the input image file are output to the transformation matrix setting unit 12 shown in FIG. 1, whereas the main image data are output to the color space conversion unit 13.

The transformation matrix setting unit 12 sets a transformation matrix to be used to execute color space conversion for the main image data at the color space conversion unit 13. Apparatuses including printers such as the printing apparatus 1 and monitors, which print image data input thereto and output input image data as images respectively, normally have color characteristics (color spaces) which vary among the individual apparatuses. For this reason, the color of a given image cannot be reproduced accurately simply by utilizing the color information in the image data directly. However, it becomes possible to express the colors of the image accurately by converting the color space in the image data to a color space inherent to the specific apparatus and translating the color information values indicated in image data to values in the color space inherent to the subject apparatus (hereafter referred to as color space conversion). In this color space conversion, a transformation matrix is utilized as explained below.

The color space conversion unit 13 executes color space conversion by using the color information values corresponding to each pixel constituting the image data for substitution in transformation expressions that use a transformation matrix. For instance, when (R1, G1, B1) represents the three sets of color information corresponding to a single pixel in the input image data, the corresponding sets of color information (Rc1, Gc1, Bc1) at the same pixel resulting from the color space conversion can be expressed as in transformation expressions 1 presented below.

$Rc1 = a \cdot R1 + b \cdot G1 + c \cdot B1$ $Gc1 = d \cdot R1 + e \cdot G1 + f \cdot B1$ $Bc1 = g \cdot R1 + h \cdot G1 + i \cdot B1$ (1) provided that;

a, b, c, d, e, f, g, h, i: constant

Expression (1) above indicates that the transformation matrix is defined as a determinant defined by the individual constants a through i. By executing a matrix mathematical operation with the transformation matrix and the color information (R1, G1, B1), the post-color space conversion color information (Rc1, Gc1 Bc1) is calculated.

The transformation matrix setting unit 12 has stored therein in advance the transformation matrix (hereafter referred to as an initial transformation matrix) a to i to be used to convert the sRGB color space to the color space inherent to the printing apparatus 1 (hereafter referred to as an inherent color space). Thus, if the color space set in the image file is sRGB, the sRGB color space can be converted to the inherent color space at the color space conversion unit 13 by using the initial transformation matrix a to i. However, the color space set in the image file is the Adobe RGB color space, it cannot be converted to the inherent color space by using the initial transformation matrix. In such a case, the transformation matrix setting unit 12 reorganizes the initial transformation matrix a to i to calculate a transformation matrix a' to i' to be used to execute color space conversion on the Adobe RGB color space to convert it to the inherent color space.

The transformation matrix setting unit 12 reorganizes the initial transformation matrix based upon the contents of the tag data in the image file, and more specifically, the contents of the color space information tag described earlier. Next, the various types of information recorded in the color space information tag are explained individually.

The chromaticity coordinate values of the reference white point indicate the x and y chromaticity coordinates of a reference white point in the color space used in the image file. The color of the reference white point is conceived to be white in the color space. In addition, the x and y chromaticity coordinates indicate the color by using the X value and the Y value among the three stimulus values of color, X, Y and Z. If the Adobe RGB color space is set in the image file, (X, Y)=(0.313, 0.329) are recorded.

The chromaticity values of the three primary colors the image, i.e., the x and y chromaticity coordinates corresponding to each of R, G and B colors, are recorded as the chromaticity coordinate values of the primary colors. The following values are recorded as this information if the Adobe RGB color space is set in the image file.

R: (X,Y)=(0.64,0.33)
G: (X,Y)=(0.21,0.71)
B: (X,Y)=(0.15,0.06)

The value of the coefficient γ in the reproducing transformation function is recorded as the reproduction γ. The reproducing transformation function, which is a γ function expressed as in (2) below, is used to correct the color gradation characteristics by converting $x_0$ representing one of the color information values corresponding to R, G and B in the image file to a color information value $y_0$ as expressed in (2).

$y_0 = x_0^\gamma$ (2)

γ=2.2 is recorded as the reproduction γ value when the Adobe RGB color space is set in the image file. It is to be noted that the γ function with γ set to 2.2 represents the gradation characteristics of a standard monitor of a personal computer at which images are displayed. By taking this into consideration, the DSC 2 adjusts the gradation characteristics of image by using a γ function with the γ set to 1/2.2 so as to ensure that the images are displayed at the monitor with correct gradation characteristics.

By using the color space information tag described above, the Adobe RGB color space can be reproduced. In addition, the sRGB color space information is stored in memory at the transformation matrix setting unit 12 in advance. Based upon the sRGB color space information stored therein and the Adobe RGB color space information in the color space information tag, the transformation matrix setting unit 12 calculates the transformation matrix a' to i' to be used to convert the Adobe RGB color space to the inherent color space by reorganizing the initial transformation matrix a to i. It is to be noted that if the color space in the image file is a color space other than Adobe RGB color space, too, the initial transformation matrix can be reorganized in a similar manner based upon the sRGB color space information stored in memory and the various types of information in the color space information tag.

The transformation matrix calculated by reorganizing the initial transformation matrix as described above is output from the transformation matrix setting unit 12 to the color space conversion unit 13. The color space conversion unit 13 uses this transformation matrix as explained earlier when it executes the color space conversion on the main image data having color information expressed by using the Adobe RGB color space. The main image data having undergone the color space conversion are output from the color space conversion unit 13 to the printing control unit 14.

The printing control unit 14 controls the printing unit 15 based upon the main image data having undergone the color space conversion and then output from the color space conversion unit 13. For instance, it controls the ink output position and the ink output quantity at the printing unit 15 so as to reproduce the color information values corresponding to each pixel in the main image data having undergone the color space conversion, and the printing unit 15, in turn, outputs the ink onto the printing paper as instructed by the printing control unit. It is to be noted that different color inks, such as C (cyan), M (magenta), Y (yellow) and K (black), are used at the printing unit 15, and the ink quantities and the output positions for the various color inks are determined based upon the color information values in the main image data.

Figure 3:
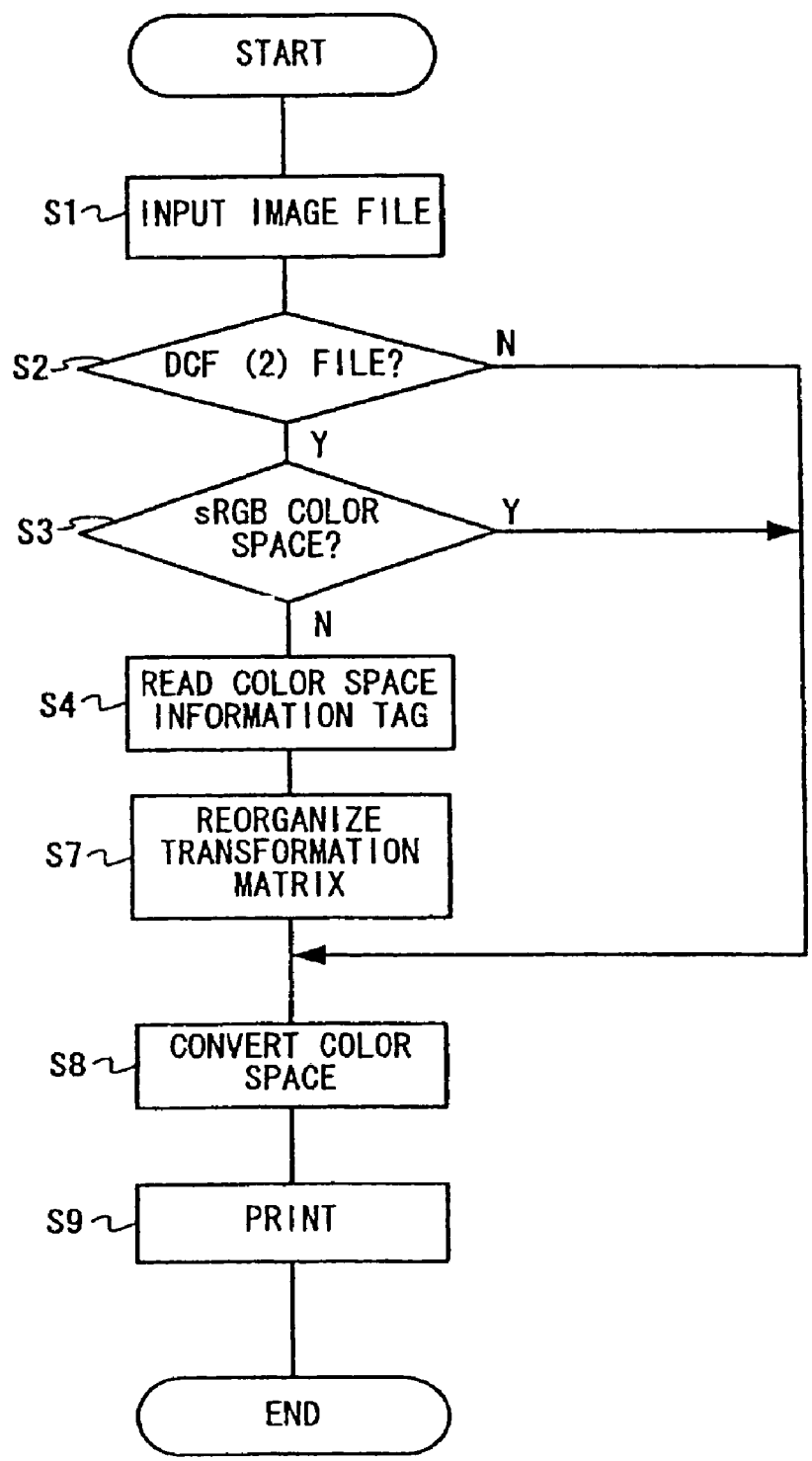
FIG. 3 presents a flowchart of the processing executed in the printing apparatus.

The printing apparatus 1 prints out an image captured at the DSC 2, as explained above. FIG. 3 presents a flowchart of the control program executed in the printing apparatus 1 during this operation. The control program is installed in a memory (not shown) inside the printing apparatus 1. In step S1, an image file containing an image captured in the DSC 2 is input from the memory card 3 to the card reader unit 11. In step S2, a decision is made as to whether or not the image file input in step S1 was recorded in the DCF (2) format. This decision is made by checking the contents of the compatibility identification index mentioned earlier, and if the compatibility identification index indicates "R03", an affirmative decision is made in step S2 and the operation proceeds to step S3. If, on the other hand, the compatibility identification index indicates "R98", a negative decision is made in step S2 and the operation proceeds to step S8. It is to be noted that it is desirable to halt the processing in FIG. 3 and display an error message at the display unit (not shown), if the compatibility identification index indicates neither "R03" nor "R98".

In step S3, a decision is made as to whether or not the sRGB color space is set in the image file. This decision is made by checking the color space identification tag explained earlier, and if the color space identification tag indicates "calibrated", an affirmative decision is made in step S3 and the operation proceeds to step S8. If, on the other hand, it indicates "uncalibrated", a negative decision is made in step S3 and the operation proceeds to step S4. As in step S2, it is desirable to halt the processing in FIG. 3 and display an error message at the display unit if the color space identification tag indicates neither "calibrated" nor "uncalibrated".

In step S4, the color space information tag is read from the image file. In step S7, the transformation matrix setting unit 12 calculates a transformation matrix to be used to convert the Adobe RGB color space to the inherent color space by reorganizing the initial transformation matrix. The color space information tag read in step S4 is used as explained earlier for this calculation. The transformation matrix calculated in step S7 is output from the transformation matrix setting unit 12 to the color space conversion unit 13.

In step S8, the color space conversion unit 13 executes color space conversion on the main image data by using the transformation matrix output from the transformation matrix setting unit 12. At this time, if the color space of the main image data is sRGB, i.e., if the image file was recorded in the DCF format or if the color space identification tag indicates "calibrated", a negative decision will have been made in step S2 or an affirmative decision will have been made in step S3, and accordingly, the operation will have skipped step S7. Thus, the initial transformation matrix is used in step S8 in such a case. If, on the other hand, the color space is Adobe RGB, the processing in step S7 will have been executed and accordingly, the transformation matrix calculated by reorganizing the initial transformation matrix is used in step S8. In step S9, a printing operation is executed by the printing control unit 14 and the printing unit 15 based upon the main image data having undergone the color space conversion executed in step S8 and the image captured in the DSC 2 is printed out.

As explained above, an image file of image data captured in the DSC 2 is input to the printing apparatus 1 (step S1), a decision is made as to whether or not the color space used in the image file is sRGB based upon the contents of the color space identification tag (step S3), the contents of the color space information tag are read if the color space is not sRGB (step S4) and the transformation matrix to be used to convert the Adobe RGB color space used in the main image data to the inherent color space is calculated by reorganizing the initial transformation matrix (step S7) in the printing apparatus 1. Then, the color space conversion is executed on the main image data by using the transformation matrix (step S8) and the captured image is printed out (step S9).

The following advantage is achieved with the printing apparatus 1 described above.

(1) A decision is made as to whether or not the color space used in an image file is sRGB based upon the contents of the color space identification tag, and if it is decided that a color space other than sRGB is used, the color space information tag is referenced. Then, based upon the contents of the referenced color space information tag, the color space conversion unit 13 converts the Adobe RGB color space set in the image file to the color space inherent to the printing apparatus 1. During this process, the initial transformation matrix used to convert the sRGB color space to the inherent color space, which is stored in the transformation matrix setting unit 12, is reorganized based upon the contents of the color space information tag. As a result, the color information in the image file expressed by using the Adobe RGB color space can be read with a high level of accuracy based upon the contents of the referenced color space information tag to enable a print out of the image.

While the printing apparatus 1 prints out an image recorded in the DCF (2) format by reading the image file into the printing apparatus 1 in the embodiment described above, the present invention is not limited to this example. The present invention may also be adopted in, for instance, a personal computer that displays an image on a monitor by reading the image file. Namely, the present invention may be adopted in all types of image file processing apparatuses that read image files and execute various types of processing on the image files having been read (input). In such an image processing apparatus, the color space of an image file having been read is converted to a color space suitable for or compatible with the processing to be executed in the image processing apparatus.

In addition, while an explanation is given above in reference to the embodiment on an example in which either the sRGB color space or the Adobe RGB color space is set in an image file, a color space other than either of those may be set for the image file. As long the image file includes information equivalent to the color space identification tag and the color space information tag explained in reference to the embodiment, the present invention may be adopted in an apparatus that reads the image file. Namely, the color space identification tag provides information that indicates whether or not the color space set in the image file is a specific type of color space and the color space information tag provides color space information related to the color space other than the specific color space.

Furthermore, while an explanation is given above in reference to the embodiment on an example in which an image captured in the DSC 2 is recorded as an image file in the memory card 3 and the image file is read from the memory card 3, the present invention may instead be adopted in an apparatus that reads an image file recorded and input by adopting any of various other methods.

Figure 4:
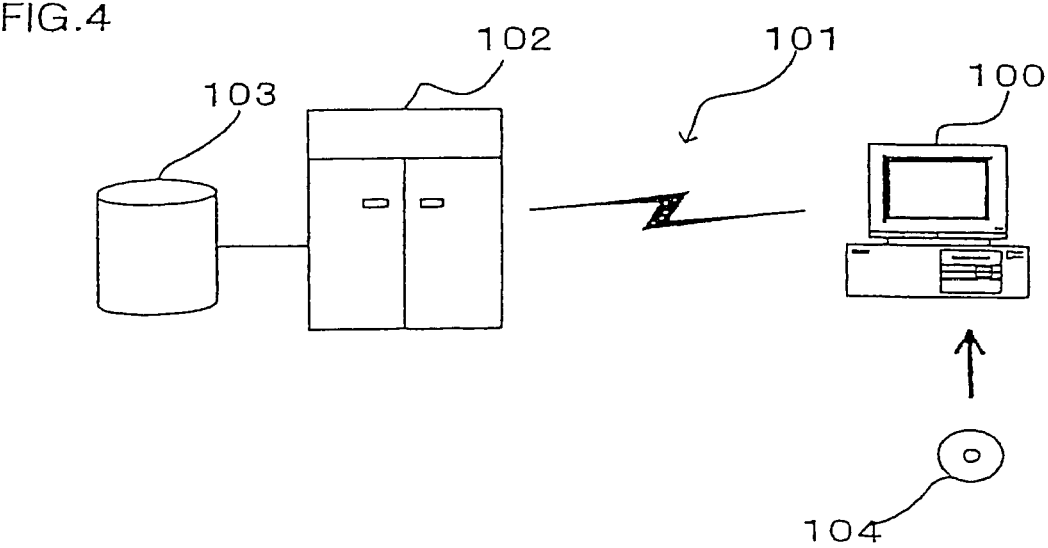
FIG. 4 shows how the control program may be provided to a personal computer.

When the present invention is adopted in a personal computer or the like, the control program explained earlier may be provided in a recording medium such as a CD-ROM or through a data signal on the Internet or the like. FIG. 4 shows how the control program may be provided in those forms. A personal computer 100 receives the program via a CD-ROM 104. The personal computer 100 can also be connected with a communication line 101. A computer 102 is a server computer that provides the program stored in a recording medium such as a hard disk 103. The communication line 101 may be a communication line that enables Internet communication, personal computer communication or the like, or it may be a dedicated communication line. The computer 102 reads out the program from the hard disk 103 and transmits the program to the personal computer 100 via the communication line 101. Namely, the program is embodied as a data signal on a carrier wave to be transmitted via the communication line 101. In other words, the program can be provided as a computer-readable computer program product adopting any of various modes such as a recording medium or a carrier wave.

The above described embodiment is an example and various modifications can be made without departing from the spirit and scope of the invention.

What is claimed is:

1. An image file processing method adopted in an image file processing apparatus including a processing unit, comprising steps for:

inputting an image file into the image file processing apparatus by the processing unit;

making a decision as to whether or not a standard of recording method used in the image file is a predetermined standard that is newer than a conventional standard based upon a compatibility identification information;

making a decision by the processing unit as to whether or not the input image file uses a specific color space based upon color space identification information that is stored in the input image file and that includes a first information that indicates the specific color space being used in the input image file or a second information that indicates a color space other than the specific color space being used in the input image file if the standard of recording method used in the image file is the predetermined standard;

converting by the processing unit the specific color space to a color space suitable for processing to be executed in the image processing apparatus by using a first conversion information stored in advance in the image processing apparatus if the color space identification information is determined to include the first information; and converting by the processing unit a color space used in the input image file to the color space suitable for the processing to be executed in the image processing apparatus by using a second conversion information stored in the input image file if the color space identification information is determined to include the second information, the second conversion information being information different from the color space identification information.

2. The image file processing method according to claim 1, wherein:

the first conversion information stored in advance in the image processing apparatus relates to conversion of the specific color space to the color space suitable for the processing to be executed in the image processing apparatus; and the second conversion information stored in the input image file relates to the color space used in the input image file.

3. An image file processing method adopted in an image file processing apparatus including a processing unit, comprising steps for:

inputting by the processing unit, into the image file processing apparatus an image file containing at least color information corresponding to each of pixels defined by a color space used in the image file, a color space identification tag that includes a first information that indicates a first color space being used in the input image file or a second information that indicates a color space other than the first color space being used in the input image file and a color space information tag providing color space information related to the color space used in the image file, the color space identification tag being a tag different from the color space information tag;

making a decision by the processing unit as to whether or not the color space used in the image file is the first color space based upon the color space identification tag; and referencing by the processing unit the color space information tag in the image file only if the color space identification tag is determined to include the second information, wherein:

the color space used in the image file determined to be other than the first color space is converted to a second color space based upon the referenced color space information tag;

the color information in the image file is expressed by using the second color space;

a transformation matrix to be used to convert the first color space to the second color space is stored in a memory;

if the color space identification tag is determined to include the first information, the color space used in the image file is converted from the first color space to the second color space based upon the transformation matrix: and if the color space identification tag is determined to include the second information, the transformation matrix is reorganized based upon the referenced color space information tag and the color space used in the image file is converted to the second color space based upon the reorganized transformation matrix.

4. An image file processing method adopted in an image file processing apparatus including a processing unit, comprising steps for:

storing by the processing unit in a memory a transformation matrix to be used to convert a first color space to a second color space;

inputting by the processing unit into the image file processing apparatus an image file containing at least color information corresponding to each of pixels defined by either the first color space or a third color space, a color space identification tag that includes a first information that indicates the first color space being used in the input image file or a second information that indicates a color space other than the first color space being used in the input image file, and a color space information tag providing color space information related to the third color space if the color space used in the image file is not the first color space, the color space identification tag being a tag different from the color space information tag;

making a decision by the processing unit as to whether or not the color space used in the image file is the first color space based upon the color space identification tag;

converting by the processing unit the color space used in the image file from the first color space to the second color space based upon the transformation matrix if the color space identification tag is determined to include the first information;

reorganizing by the processing unit the transformation matrix based upon the color space information tag and converting the color space used in the image file from the third color space to the second color space based upon the reorganized transformation matrix, if the color space identification tag is determined to include the second information; and expressing by the processing unit the color information in the image file by using the second color space.

5. An image file processing apparatus comprising:
a processing unit that executes an image file processing method according to claim 1.

6. An image file processing apparatus comprising:
a processing unit that executes an image file processing method according to claim 3.

7. A computer-readable medium storing:
a computer-executable control program that executes an image file processing method according to claim 1.

8. A computer-readable medium storing:
a computer-executable control program that executes an image file processing method according to claim 3.

9. An image file processing apparatus comprising:
a processing unit that executes an image file processing method according to claim 4.

10. A computer-readable medium storing:
a computer-executable control program that executes an image file processing method according to claim 4.

* * * * *